United States Patent [19]
Zaenglein et al.

[11] Patent Number: 5,990,441
[45] Date of Patent: Nov. 23, 1999

[54] DAMPER TUBE CLOSURE

[75] Inventors: Daniel Patrick Zaenglein, Springboro, Ohio; Eric John Roszman, Owosso, Mich.; Craig Thomas Lehman, Beavercreek, Ohio

[73] Assignee: General Motors Corporation, Detroit, Mich.

[21] Appl. No.: 08/986,468

[22] Filed: Dec. 8, 1997

[51] Int. Cl.⁶ .................................................. B23K 11/00
[52] U.S. Cl. .................... 219/78.16; 29/897.2; 228/173.4
[58] Field of Search .................... 219/61.11, 67, 219/78.16, 117.1; 228/173.1, 173.2, 173.4, 265, 182; 29/897.2; 72/126

[56] References Cited

U.S. PATENT DOCUMENTS

| | | | |
|---|---|---|---|
| 3,643,322 | 2/1972 | Gerstle | 219/67 |
| 5,644,826 | 7/1997 | Reves | 29/243.5 |
| 5,718,139 | 2/1998 | Gardner | 72/126 X |

FOREIGN PATENT DOCUMENTS 58-116986  7/1983  Japan .

*Primary Examiner*—Gregory Mills
*Attorney, Agent, or Firm*—Robert M. Sigler

[57] ABSTRACT

A closed end tube particularly for use in a vehicle suspension damper includes a tubular body with an attachment fitting fixed to the end of the tube where the closed end of the tube is manufactured according to a multi-step process. Initially, the process commences with a tubular body having an opening at both ends. One of the ends is formed so that the tube is partially closed with a reduced opening remaining. An attachment fitting is forced against the partially closed end of the tube to completely close the end and a welding operation is used to fix the attachment fitting to the now closed end of the tube.

9 Claims, 3 Drawing Sheets

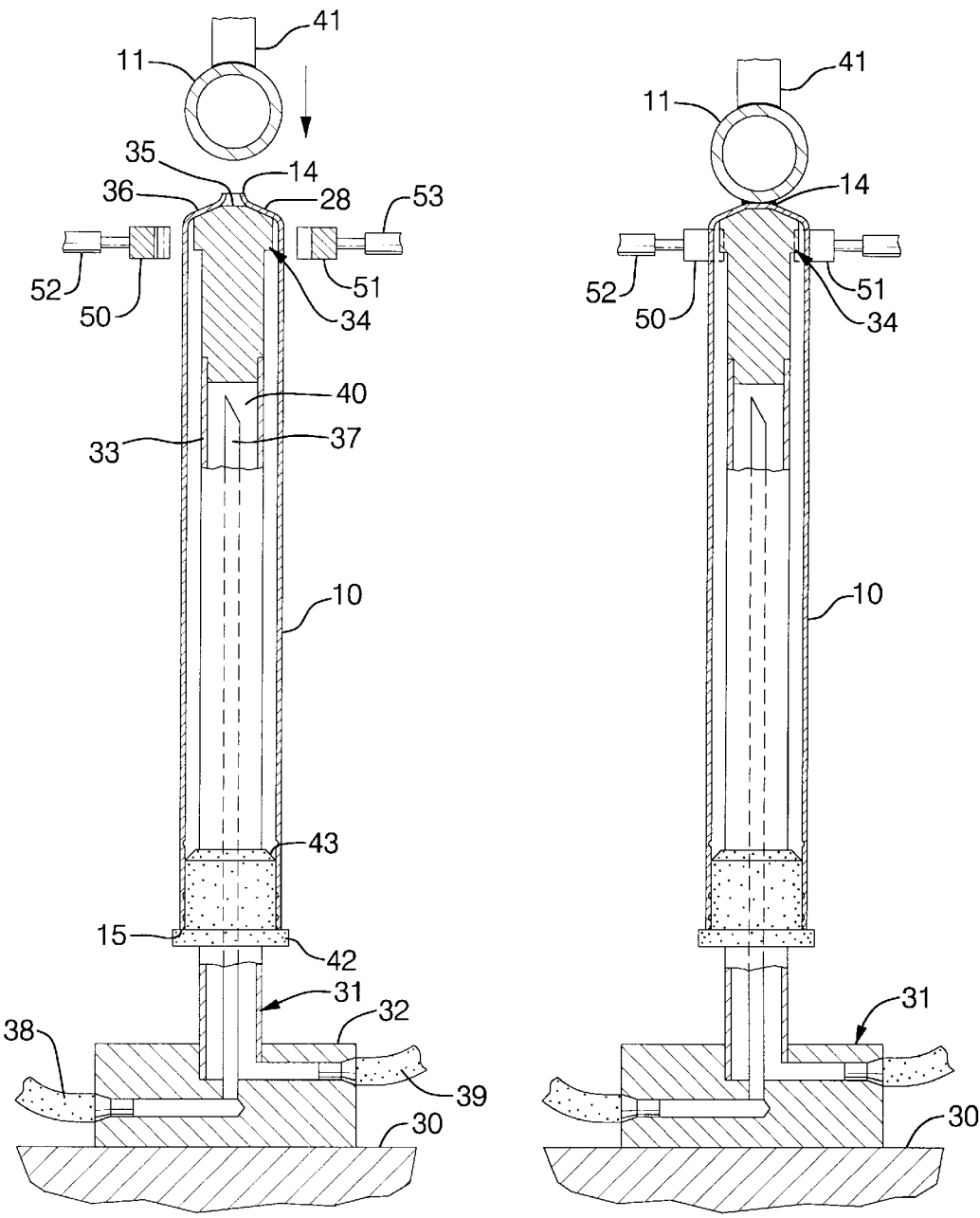
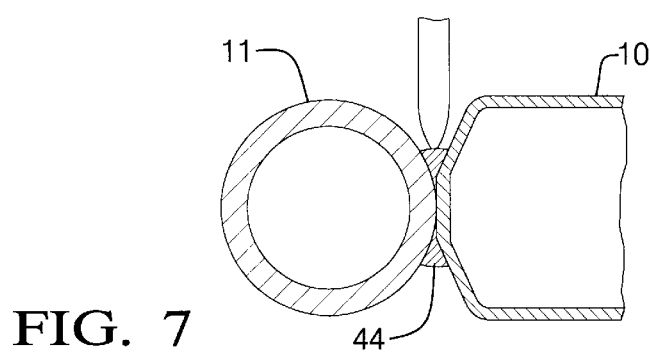
FIG. 5   FIG. 6
FIG. 7

DAMPER TUBE CLOSURE

TECHNICAL FIELD

The present invention relates to a tube closure process and more particularly, to the manufacture of a hydraulic suspension damper with a welded attachment fitting connected to a closed end of a tube, wherein the tube requires a fluid-tight seal at the closed end.

BACKGROUND OF THE INVENTION

Closed tubes with connected attachment fittings are often used in vehicle suspension dampers. A damper operates in vehicle suspensions as a damping device controlling the sprung (body) and unsprung (wheels) masses of a vehicle by reducing loads and vertical accelerations that are normally transmitted from the wheels to the body. Damping is accomplished by converting kinetic energy into thermal energy and dissipating the heat. Conventionally hydraulic dampers include a piston with a connected piston rod slidably carried in a fluid-filled tube and separating the tube into extension and compression chambers. A rod guide at the top end of the tube closes the extension chamber and slidably engages the piston rod. The piston rod and the tube are provided with attachment fittings for connection to the sprung and unsprung masses. Due to the damper's operating environment, the fittings must be securely connected to withstand the applied forces and a fluid-tight closure of the tube must be established and maintained during operation.

The various types of known vehicle suspension dampers use several different methods to close the ends of the tubular sections. In applications such as MacPherson struts, a cap (base cup) is placed in the end of the tube, and the tube and cap are connected together and sealed by gas metal arc welding or resistance seam welding to complete the assembly. These welds produce a strong joint and a leak-free seal of the unit. Other methods of closing damper tubes utilize a series of extrusions with intermediate annealing operations to produce a closed-tubular component from a solid steel blank. Closing a tube end over an arbor by means of an external forming tool is also known. These methods, which often undesirably require the introduction of heat from an external source require extensive cleaning operations to remove oxide coatings and other contaminants. In some cases heat is required to permit adequate formation of the steel tubing material while avoiding failure in tension due to extraordinarily severe metal working conditions. Accordingly, a new method of producing a closed tube and attachment fitting assembly would preferably operate without the introduction of external heat during forming operations and would result in a securely sealed joint.

SUMMARY OF THE INVENTION

An aspect of the present invention involves eliminating the need for a separate base cup in the manufacture of a closed end damper tube. According to the present invention, a unique metal forming technique is utilized whereby a tube end is only partially closed through relative rotation by a tool that is advanced over the open end of the tube until partial closure is achieved. This is preferably achieved without the introduction of an externally applied heat source. Tube closure is conducted to a point that an upturned projecting ring is provided at the end of the tube providing a preferred feature for facilitating the welding of an attachment fitting to the tube. During the welding operation the end of the tube is completely closed and sealed as the attachment fitting is secured to the tube. An auxiliary weld is optionally applied around the attachment fitting to tube joint for increased shear strength, when preferred.

Accordingly, the invention includes a closed end tube having a tubular body with an attachment fitting fixed to the end of the tube. Initially, the tubular body has an opening at the end, and the end is subsequently formed so that the opening is partially closed. The attachment fitting is then forced against the tube to completely close the end, and a welding operation is used to fix the attachment fitting to the end of the tube providing a fluid-tight seal. Optionally, a secondary welding operation is used when increased shear strength is preferred.

BRIEF DESCRIPTION OF THE DRAWINGS

The present invention will now be described by way of example with reference to the accompanying drawings in which:

FIG. 5 is a fragmentary cross-sectional schematic illustration of a step in a welding process of the present invention.

FIG. 6 is a fragmentary cross-sectional schematic illustration of a step in the welding process of the present invention illustrated in FIG. 5.

FIG. 7 is a fragmentary cross-sectional schematic illustration of an optional secondary welding operation according to the present invention.

DESCRIPTION OF THE PREFERRED EMBODIMENT

Figure 1:
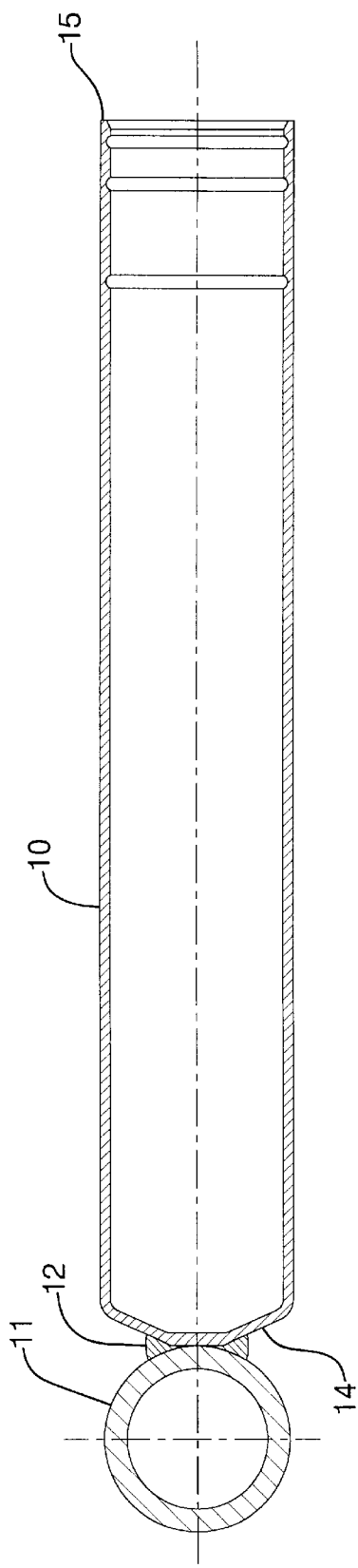
FIG. 1 is a cross-sectional illustration of a closed end tube and attachment fitting assembly produced according to an aspect of the present invention.
Figure 2:
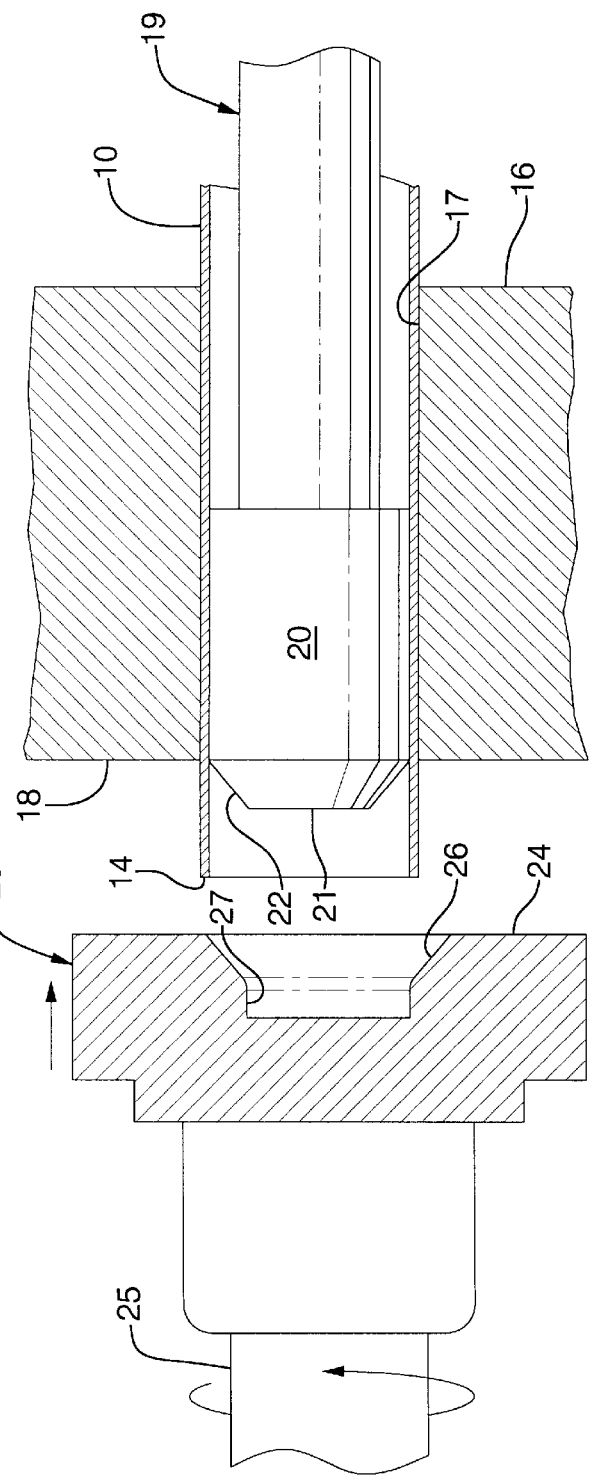
FIG. 2 is a schematic illustration of a partial closure process of an open ended tube according to the present invention as used in producing an assembly such as that shown in FIG. 1.

Referring to the drawings, illustrated in FIG. 1 is an assembly including a suspension damper tube 10 and an attachment fitting 11 that are secured together at a joint 12. The tube 10 includes a closed end 14 that provides a convenient location for connecting the attachment fitting 11 and that provides a fluid-tight closure for an assembled damper (not illustrated), of a type well known in the art. The tube 10 also includes an open end 15 that is adapted to receive additional components of the assembled suspension damper in a manner that also provides a fluid-tight sealed closure of the damper tube 10. Referring to FIG. 2, the process of closing the closed end 14 of the tube 11 as shown in FIG. 1 is illustrated in an initial stage. Tube 10 is selected with a substantially open continuous cross section. The tube 10 is rigidly held in an appropriate tooling fixture 16 so that it is positioned within opening 17. The end 14 of tube 10 prior to closure is held at a predetermined distance from the edge 18 of fixture 16 and an arbor 19 having an enlarged head 20 is inserted within the tube 10. The head 20 includes a terminal end 21 with a beveled annular surface 22 that approximates the final shape of the end 14 after forming. With the tube 10 clamped in the fixture 16, a forming tool 23 is advanced toward the tube 10 while moving in a wobble-type nonuniform rotary motion, in-that the rotation is not about a single axis. The forming tool 23 includes a bell-shaped head 24 mounted on a spindle 25. The head 24 includes a central opening with an angled surface 26 that approximates the shape of the completed closed end 14 of the tube 10 as seen in FIG. 1. The opening in head 24 also includes a wall 27 adjacent the surface 26 that is provided in a substantially concentric manner with the wall of tube 10 prior to the closing operation.

Figure 3:
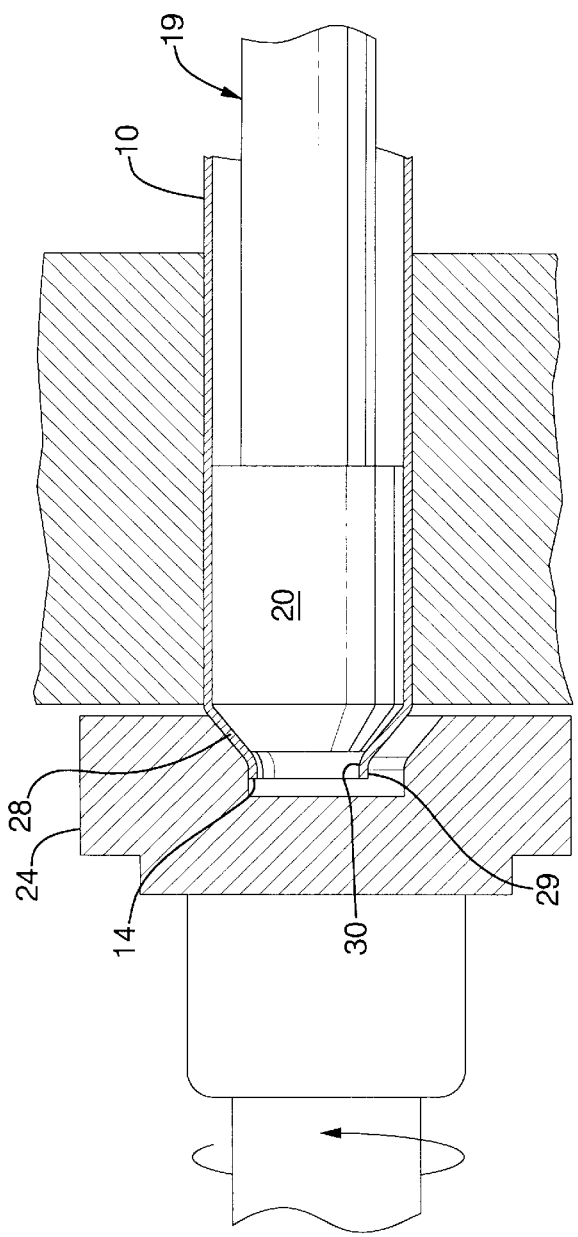
FIG. 3 is a schematic illustration of a partial closure process of an open ended tube according to the present invention as used in producing an assembly such as that shown in FIG. 1.
Figure 4:
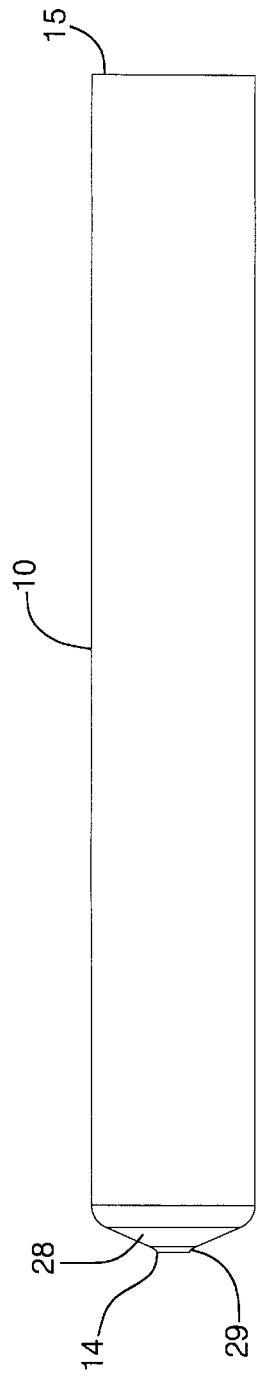
FIG. 4 is an illustration of a partially closed tube produced according to a process of the present invention such as that illustrated in FIGS. 2 and 3.

As seen in FIG. 3, while turning in the nonuniform rotary motion, the head 24 is advanced into contact with the tube 10 resulting in deformation of the end 14 so that an annular beveled wall 28 with an extending longitudinally oriented terminal ring-like projection 29 is formed. Within the ring-like projection 29 an opening 30 of a predetermined diameter remains after the forming operation. The tube 10 is then removed from the fixture 18 resulting in a structure with an open end 15 and the end 14 that is partially closed as shown in FIG. 4. The extending ring-like projection 29 is formed adjacent the beveled wall 28 providing a protruding feature at the end 14 of tube 10.

The partially closed tube 10 as shown in FIG. 4 is then loaded into a welding machine 30 as shown in FIG. 5. Welding machine 30 includes a fixture 31 onto which the partially closed tube 10 is loaded for application of the attachment fitting 11. The fixture 31 includes a base 32 that is attached to the welding machine 30 and that carries a casing 33 of a length greater than that of the tube 10. Casing 33 carries an arbor 34 at its end opposite the base 32. The arbor includes a terminal end 35 that is substantially perpendicular to the wall of the tube 10, and an angled surface 36 that substantially matches the beveled wall 28 of the tube 10. The base 32 also carries a coolant tube 37 that extends within the casing 33 and terminates near the arbor 34. The tube 37 is open to one coolant supply hose 38 and the casing 33 is opened to another coolant supply hose 39. A coolant such as water is circulated through the open space 40 within the casing 33 to carry heat away from the arbor 34 as it is generated in the welding process. A pair of clamps 50 and 51 are positioned near the end 14 of tube 10 and are movable into contact with the tube 10 through operation of fluid powered cylinders 52 and 53.

The attachment fitting 11 is positioned in contact with an electrode 41 and is movable toward the end 14 of the tube 10. The arbor 34 operates as an electrode providing electrical conduction through the casing 33 and the base 32 to the welder 30 and the tube 10 is positioned in contact with the arbor 34 and is held away from the casing 33 by an insulating collar 42. The collar 42 includes a tapered upper edge 43 to facilitate loading of the tube 10 onto the fixture 31, when the tube 10 is positioned on the arbor 34, the clamps 50 and 51 are moved into engagement with the tube 10 to hold it in position. The clamps 50 and 51 are preferably made of a copper material and are used to conduct the primary current path during welding.

As shown in FIG. 6 the attachment fitting 11 is forced against the end 14 of the tube 10 closing the end 14 under an applied force, and while the force is maintained, a current of a selected amperage for a selected amount of time is passed between the electrode 41 and the arbor 34/ clamps 50–51, securely attaching the attachment fitting 11 to the tube 10 and sealing the end 14 closed. Sufficient force is generated between the attachment fitting 11 and the end 14 to collapse the material of the protruding ring 29, which assists in closing the end 14 without the addition of filler material during this welding step.

Subsequent to the resistance welding operation conducted on the welding machine 30, the tube 10 with connected attachment fitting 11 is removed from the fixture 31 and a gas metal arc welding process is optionally used to apply an annular bead around the joint between the tube 10 and the attachment fitting 11 where the application requires additional tensile strength above that provided by the resistance weld.

According to the process of the present invention, an assembly comprising a tube 10 for a suspension damper with an attachment fitting 11 as shown in FIG. 1 is provided, which eliminates the need for a separate base cup component in the assembly of a suspension damper. A unique metal forming technique is used whereby the tube end is only partially closed by a rotating tool that is advanced over an open end of the tube until partial closure is achieved. This partial closure is accomplished without the aide of an externally applied heat source. The rate of advancement and the rotational speed of the tool is coordinated so that a preferred partially closed shape is obtained which leaves a projecting ring that is advantageous for the subsequent resistance welding operation. The attachment fitting is resistance welded to the partially closed end of the tube providing a leak-free closed end, which is achieved from the tube material alone without the application of additional material during the resistance welding process. If additional strength is required for severe applications, an auxiliary gas metal arc welding process is used to bolster the strength of the attachment fitting to tube joint.

We claim:

1. A method of manufacturing a tube suitable for containing a sliding piston in a damper, the tube having a tubular body having an end with an attachment fitting fixed to the end wherein the tube is manufactured according to the steps of: (a) starting with the tube having an opening at the end with a first diameter; (b) forming the end so that the opening is partially closed by a smooth, annular beveled wall tapering to a smooth, ring-like opening having a second diameter smaller than the first diameter; (c) forcing the attachment fitting against the end to completely close the end; and (d) welding the attachment fitting to the end.

2. A method of manufacturing a tube according to claim 1 wherein the attachment fitting is forced against the end by an applied force wherein the applied force is maintained while an electrical current is applied through the end and the attachment fitting so that the attachment fitting is resistance welded to the end without the application of filler material.

3. A method of manufacturing a tube according to claim 2 wherein a joint is formed between the end of the tube and the attachment fitting and further comprising the step of applying a bead around the joint by welding with the addition of filler material to increase the shear strength of the joint.

4. A method of manufacturing a tube having a closed end with an attachment fitting joined to the closed end comprising the steps of:

(a) selecting a tube having a substantially constant open cross section with a first inner diameter;

(b) positioning the tube in a fixture so that an end of the tube extends out from the fixture;

(c) advancing a tool against the end of the tube while supplying relative rotation between the tool and the tube so that the end of the tube enters a head of the tool;

(d) producing a partial closure of the end of the tube into a smooth, annular beveled wall tapering to a smooth, ring-like opening having a second inner diameter smaller than the first inner diameter;

(e) removing the tube from the fixture;

(f) loading the tube over a welding arbor of a welding machine;

(g) forcing an attachment fitting against the end of the tube so that the end of the tube is compressed between the attachment fitting and the welding arbor, collapsing the end of the tube so that the end of the tube is closed between the attachment fitting and the welding arbor; and (h) applying a current between the attachment fitting and the welding arbor to join the attachment fitting to the end, sealing the end closed.

5. A method of manufacturing a tube according to claim 4 further comprising the step of inserting a forming arbor into the tube before the tool is advanced against the end of the tube.

6. A method of manufacturing a tube according to claim 5 wherein the forming arbor has a beveled annular surface that approximates the shape of the smooth, annular beveled wall.

7. A method of manufacturing a tube according to claim 6 wherein a joint is produced between the attachment fitting and the end of the tube and further comprising the step of applying a bead around the joint by a subsequent welding process to increase the shear strength of the joint.

8. A method of manufacturing a tube having a closed end with an attachment fitting joined to the closed end comprising the steps of:

(a) selecting a tube having a substantially constant open cross section with a first inner diameter;

(b) positioning the tube in a fixture so that an end of the tube extends out from the fixture;

(c) inserting a forming arbor into the tube wherein the forming arbor has a head that is positioned near the end of the tube;

(d) advancing a tool against the end of the tube while supplying relative rotation between the tool and the tube so that the end of the tube enters a head of the tool wherein the relative motion is nonuniform and is of a wobble-like type wherein the relative motion is not about a single axis;

(e) producing a partial closure of the end of the tube into a smooth, annular beveled wall tapering to a smooth, ring-like opening having a second inner diameter smaller than the first inner diameter;

(f) removing the tube from the fixture;

(g) loading the tube over an arbor of a welding machine;

(h) forcing an attachment fitting against the end of the tube so that the end of the tube is compressed between the attachment fitting and the arbor, collapsing the end of the tube so that the end of the tube is closed between the attachment fitting and the arbor; and (i) applying a current between the attachment fitting and the arbor to join the attachment fitting to the end, sealing the end closed.

9. A method of manufacturing a tube according to claim 8 wherein the end of the tube is partially closed in step (e) without the introduction of an external heat source.

* * * * *